United States Patent [19]

Morgenthaler et al.

[11] Patent Number: 5,222,448
[45] Date of Patent: Jun. 29, 1993

[54] PLASMA TORCH FURNACE PROCESSING OF SPENT POTLINER FROM ALUMINUM SMELTERS

[75] Inventors: George W. Morgenthaler, Boulder, Colo.; Jeffrey L. Struthers, Falls Church, Va.; George W. Carter, Gloucester, Canada

[73] Assignee: Columbia Ventures Corporation, Vancouver, Wash.

[21] Appl. No.: 868,024

[22] Filed: Apr. 13, 1992

[51] Int. Cl.$^5$ .................................. F23G 7/04
[52] U.S. Cl. .................................. 110/346; 110/250; 588/227
[58] Field of Search ............... 110/250, 346; 588/227

[56] References Cited

U.S. PATENT DOCUMENTS

| | | | |
|---|---|---|---|
| 4,763,585 | 8/1988 | Rickman et al. | 110/346 |
| 4,989,522 | 2/1991 | Cline et al. | 110/250 |
| 4,993,323 | 2/1991 | Tabery et al. | 110/346 |
| 5,095,828 | 3/1992 | Holden et al. | 110/250 |
| 5,138,959 | 8/1992 | Kulkarni | 110/346 |

Primary Examiner—Edward G. Favors
Attorney, Agent, or Firm—Donald W. Margolis

[57] ABSTRACT

Spent potliner from aluminum reduction cells includes carbon, inorganic brick and refractory material, and fluoride, sulfur, and cyanide compounds, and is considered hazardous. It is treated by introducing it into a vessel, and exposing it to the heat of a plasma torch at a temperature of at least 1000° C. As a result, carbon is gasified and converted to combustible carbon monoxide or hydrocarbons, or to carbon dioxide; inorganic material is melted form slag; fluoride compounds are melted, vaporized, or reduced to gaseous HF; cyanide compounds are destroyed; and all other materials, including sulfur compounds, are either melted or gasified. As a result, the spent potliner is rendered non-hazardous, and the quantity of remaining slag has both its solid volume and mass substantially reduced by a factor of at least 1.5:1 in mass and at least 3:1 in volume relative to the input spent potliner. The process allows gaseous fluoride compounds to be captured and thermal energy produced in the process to be extracted. The molten slag material produced within the vessel is removed from the vessel, and cooled to form a solid slag which is substantially free of cyanide compounds, resistive to leaching, and safe for disposal. The slag has commercial utility. Combustible carbon compounds can be captured and used. When carried out at an aluminum smelting site, adequate electrical power is readily available, and there is an in situ demand for recovered fluoride compounds, combustible gases, and extracted heat.

24 Claims, 5 Drawing Sheets

PLASMA TORCH FURNACE PROCESSING OF SPENT POTLINER FROM ALUMINUM SMELTERS

BACKGROUND OF THE INVENTION

1. Field of the Invention

The present invention relates to a plasma torch furnace for the pyrolysis of carbonaceous and other spent potliner Wastes, to the conversion and recycling of hazardous wastes to useful or non-hazardous substances, and to the recovery and conservation of heat energy for the production of electricity and for process operations.

2. Background Information

The Hall-Heroult process for the production of metallic aluminum dates from the 19th century. Many refinements to the process have been made, but the basic Soderberg or Pre-bake configurations using Hall-Heroult cells remain the most common processes for aluminum production throughout the world. In these processes the bottom and internal walls of a cathode of a Hall aluminum pot are formed with a liner of carbon blocks joined by a conductive carbonaceous binder and wrapped with refractory firebricks and insulating bricks, the resulting combination being referred to as "potliner". The insulating bricks and fire bricks are composed of materials such as silica and alumina.

During the production of aluminum, the aluminum reduction pot is filled with a bath of alumina and molten salts. Over time, the migration of bath salts into the potliner results in the deterioration and eventual failure of the aluminum cell cathode. During its three to seven year life, a cathodic potliner may absorb its own weight in bath materials. The failed potliner material is referred to as "spent potliner, or "SPL".

When an aluminum reduction pot is taken out of service, the SPL is cooled and fractured to facilitate subsequent handling and disposal. The fractured SPL is a non-homogeneous material which contains carbon, silica or alumina from the insulating brick and fire bricks, aluminum, significant quantities of sodium salts, aluminum salts and oxides, fluoride salts, and traces of cyanides.

A typical cathode waste SPL composition might contain, for example:

| Component | Weight % |
|---|---|
| Carbon (as C) | 33.1 |
| Fluoride (as F) | 15.7 |
| Aluminum (as Al) | 15.1 |
| Sodium (as Na) | 14.2 |
| Silica (As $SiO_2$) | 2.7 |
| Calcium (as Ca) | 1.8 |
| Cyanide (as CN) | 0.3 |
| Sulfur (as S) | 0.1 |
| Subtotal | 83.0 |
| Oxygen and Other Trace Materials | 17.0 |
| Total | 100.00 |

On the average, a large aluminum smelter with a production capacity of 175,000 tons of aluminum per year will produce about 6,000 to 12,000 tons of SPL per year. The quantity of SPL generated annually in the United States alone has in recent years exceeded approximately 230,000 tons per year, while word-wide production of SPL is several times this quantity. The estimate for SPL stored in recoverable storage in 1991, in the U.S.A. alone, exceeded some 1.9 million tons, most of which is awaiting proper disposal.

Because of its cyanide content, its high concentration of leachable fluoride compounds, and the high volumes of SPL produced, SPL represents a significant environmental hazard and a major burden for aluminum producers, who remain ultimately liable for its proper disposition. SPL has long been listed as a hazardous waste by the U.S. Federal and state environmental authorities. Current Federal and most state regulations require that SPL ultimately be treated to explicity remove the toxic cyanide, high concentration of leachable fluoride compounds, and other characteristics which caused it to be listed as a hazardous waste before it can be placed in a landfill disposal site. However, pending the promulgation of a best practicable technologies, U.S. authorities have allowed SPL to be stored at qualified facilities until suitable methods of treatment and disposal are found.

U.S. courts have decreed that the U.S. EPA must promulgate specific regulations governing the landfill disposition of SPL by early 1993. The U.S. EPA has indicated that it will establish performance-based standards and encourage recycling and reuse of SPL materials, rather than treatment processes which take as their input the "end of the pipe" flow of wastes from the production process.

Many different approaches have been tried over the years to convert SPL to non-hazardous materials. About ten basic treatment processes for SPL are known, with several having been tried, but none having proven fully satisfactory. Most have applied either some form of combustion or chemical treatment in their efforts to convert SPL to non-hazardous materials. Incineration has had limited success largely because the combustion process has itself yielded significant concentrations of hazardous by-products, albeit different products, and such products are often of equal or greater volume than the starting SPL. Chemical processes have suffered a similar fate, replacing initial SPL constituents with compounds which are relatively less toxic, but which are still above the hazardous listing levels established by environmental authorities, with the residues being of comparable volume to the input.

Efforts have been made to decontaminate SPL by kiln calcination. However, such systems have been found to exhibit extreme operating difficulties in subsequent treatment of ash for fluoride, or in adding sand and limestone to produce a "class A" landfill by the addition of sand and limestone.

Management of SPL by the chemical extraction and recovery of fluorides has been the subject of U.S. Pat. No. 2,858,198. Also, a number of attempts have been made at incinerating SPL by fluidized bed combustion, e.g., U.S. Pat. Nos. 4,763,585 and 4,993,323. The latter patent provides a pyrosulpholysis process by which SPL is pyrolized in a high temperature fluidized bed while converting the fluoride to HF for subsequent recovery in an alumina dry scrubber. To-date, however, this process has reportedly produced nuggets which may still contain unconverted hazardous fluoride material which may be leached into the environment when subject to fracturing, such as typically occurs during bulk transportation of such brittle material to storage sites. Also, slag magma has tended to plug the fluidized bed during tests. A recent paper by Comalco Aluminum Ltd., modified this method by the use of a torroidal fluidized bed, but the paper still teaches and requires the complex treatment of wastes, such as the crushing of SPL to 1 millimeter granules before further treatment. Furthermore, all of these complex fluidized bed systems result in small reduction of the net volume of residual waste, demand a large investment in equipment and require significant plant space.

It is therefore seen that a SPL treatment process is needed which more completely eliminates the hazardous material in the SPL, while reducing the volume of wastes and/or recycling or converting the residuals to benign and useful materials. An ideal process would also be energy efficient, would minimize the handling and transport of hazardous SPL material, and would produce or recycle products having economic value. In keeping with the philosophy recently expressed by the U.S. EPA and espoused by many state environmental authorities, the ideal process would be closely integrated with the process involved in the production of the waste, thereby reducing the net amount of waste emerging from the production operation. Such a process should also be relatively compact to permit close integration of recovery and recycling processes within the aluminum production process.

The aluminum production process has several basic features which make it amenable to a more ideal SPL disposal process. For example, all aluminum smelting plants use large amounts of direct current electric power. Modern aluminum smelters operate at 200-600 mw of A.C. electric power which is converted in a rectifier yard to D.C. electric power for use in the aluminum reduction pots. Therefore, an ideal SPL treatment process at an aluminum production site might teach the use of electricity as its primary energy source. Energy might also be recovered from the use of this high quality electricity energy source, to provide, for example, process heat to ancillary production processes such as paste plant operations. Moreover, as noted above, SPL has an average carbon content of about 33%, resulting in a potential energy yield from SPL of 9 million BTU's per ton. The ideal process might also extract energy from this carbon source.

The Hall-Heroult aluminum reduction process often requires that fluoride be added to maintain the desired conditions of the salt bath in the aluminum reduction cell. Modern aluminum reduction plants usually have alumina counter-flow dry scrubbers so that fluoride gases can be adsorbed on the alumina before it is added to the cell. As noted above, fluoride ions represent almost 16% of SPL, thereby making the estimated value of fluorides which are potentially recoverable from 1991 SPL production about $43 million. Therefore, an ideal treatment process might teach the recovery and recycling of fluorides from SPL to the aluminum production process by the use of the existing alumina counter-flow dry scrubbers.

Finally, the removal of SPL requires its replacement with both carbon and with costly new refractory and fire brick linings. An ideal process for SPL treatment might teach the recovery and reuse of the refractory constituents in the SPL to provide refractory and fire brick linings for a variety of uses.

A technology which may be adaptable to the purpose of treating SPL is the use of heat supplied by a plasma arc torch. Plasma torch technology was substantially advanced through the 1960's when new plasma arc generators were developed to simulate the very high temperature conditions experienced by space vehicles re-entering the Earth's atmosphere. Unlike a combustion burner flame, a plasma arc torch can be operated in the absence of oxygen. A plasma arc is created by the electrical dissociation and ionization of a working gas to establish temperatures at the plasma arc centerline as high as 50,000° K. Commercially available plasma torches can develop flame temperatures in a furnace or work piece as high as 8000° C., or higher for sustained periods at the point of application and are available in sizes from about 100 Kw to over 6 Mw in output power.

A typical plasma torch consists of an elongated tube through which the working gas is passed, with an electrode centered coaxially within the tube. In one type of such torch, a high direct current voltage is applied across the gap between the end of the center electrode as an anode and an external electrode acting as a cathode. The external electrode might be the materials undergoing treatment, or it might be the container surface itself. The current flowing through the gas in the gap between the anode and cathode causes the formation of an arc of high temperature electromagnetic wave energy that is comprised of ionized gas molecules. Any gas or mixture of gases, including air, can be passed through the plasma torch, but nitrogen is the preferred gas for many applications because is has been found to permit a high energy transfer rate and is relatively inexpensive.

Plasma torch systems have been applied to a variety of processes, including some uses for the destruction or conversion of waste and hazardous materials. Examples include the destruction of liquid toxic wastes, and more recently, the pyrolysis of organic and inorganic materials and the recovery of aluminum metals from aluminum dross. U.S. Pat. No. 4,479,433 discloses a method and apparatus for the thermal decomposition of stable compounds. U.S. Pat. Nos. 4,438,706 and 4,509,434 disclose a procedure and equipment for destroying waste material. U.S. Pat. No. 4,644,877 discloses a method and apparatus for the pyrolytic destruction of toxic and hazardous waste materials. However, prior to the present invention, no process has been taught or suggested for the application of a plasma torch to the disposal and decontamination of SPL. Furthermore, no process has been taught or previously suggested for the application of a plasma torch for the disposal and decontamination of SPL in a configuration which integrates a plasma torch processing system into an aluminum production process at an aluminum production site, to thereby reduce the net hazardous SPL waste and the non-hazardous waste created by the aluminum production process, and to improve the economic efficiency of that process, in the regulated environment, by the recovery and recycling of valuable materials from SPL waste.

SUMMARY OF THE INVENTION

Although not limited to aluminum plant site applications, it is a principal object of the current invention to address past difficulties experienced in the destruction and disposal of SPL by integrating a plasma torch processing system into the aluminum production process. While not understood with total certainty, the plasma torch processing of SPL is believed to operate so as to melt, pyrolize and otherwise to convert contaminated solid carbonaceous materials and inorganic brick material which is present in SPL to produce inert and substantially non-leachable slag materials; to produce commercial quantities of gases such as CO and $CO_2$; to produce recoverable and recyclable fluorides; and to produce recoverable heat energy for use as process heat or for the cogeneration of electricity. The non-leachable slag materials which are produced by the process are of greatly reduced weight and volume, as compared to the original SPL, and may be recycled into useful products or disposed of in class A landfills. The integration of the process of the present invention at the site of an aluminum production process permits in-situ treatment of slag residues, and obviates the need for transporting, handling, and processing of high volumes of hazardous SPL materials to treatment sites remote from the production site.

Where the process of the present invention is integrated at the site of an aluminum production process, it exploits the inherent and unique combination of characteristics involved in the plasma torch operation and the Hall-Heroult process for aluminum reduction through a novel process in several steps. The high electrical power consumption of plasma torches, as used in the process of the current invention, is made especially practical for the intended application because the power requirements of the plasma torch-SPL processing system represent only a relatively small fraction of the very large amount of electrical power which is available and which is consumed at a typical large aluminum smelter. In situ application of the plasma torch-SPL processing system of the present invention thereby obviates or avoids a major A.C. to D.C. rectification cost that would be incurred in meeting the D.C. electrical power requirements of a stand-alone plasma torch-SPL processing facility.

Moreover, a typical installation of equipment for use in the practice of the present invention would permit the actual SPL-plasma torch and furnace and its unique and additional ancillary systems to be installed in area of less than 1000 square feet, thereby minimizing the space and equipment required, and enhancing the ability to closely integrate the process with the aluminum production process, and to minimize the need for the transportation of either input or recovery materials and process heat.

In the operation of the process of the present invention, pieces of SPL material are fed in a batch or continuous manner to a container, such as a furnace, into which the arc of a plasma torch can be directed to treat the SPL. The SPL may be fed through a feed system. In preferred embodiments, the plasma torch is continuously operating so as to produce a temperature within the container in excess of 1000° C., and preferably in excess of 1100° C. At these temperatures, the solid carbon material is quickly gasified, pyrolized, disassociated or oxidized, and the inorganic brick material which is a part of the SPL is melted. It is believed that a substantial amount of the solid carbon is converted to either carbon monoxide or carbon dioxide, depending on the amount of oxygen which is present in the container. Carbon monoxide is produced when the flow of oxygen is controlled so as to preclude the stoichiometric conversion of the carbon to carbon dioxide, and the process is so operated to produce carbon monoxide when it is desirable to produce a fuel for use, for example for the cogeneration of electricity to offset the electric power usage of the plasma torch or of an associated aluminum smelter. The process may also be operated so as to intentionally produce $CO_2$ which, if desired, may be recovered through a process of distillation, liquefaction, and freezing to produce dry ice.

Particulates entrained in the off gas stream from the plasma torch furnace can be captured by a conventional cyclone catch and returned to the plasma torch furnace for further processing.

Other volatile materials which are contained in the SPL, such as cyanide and most fluoride compounds, are believed to be uniformly pyrolized, dissociated, or oxidized to form gases which are then taken off from the container. The cyanide content of the SPL has been found to be completely or almost completely converted by the process to water, $NO_x$, and carbon monoxide or carbon dioxide, and most of the fluoride compounds are believed to be reduced to HF. The resulting fluoride rich gas stream can then be processed through one of several optional processes to recover the fluorides for removal, or preferably, to absorb the fluoride in a counter-flow dry scrubber for recirculation to the aluminum production process. The gas stream can also be processed by conventional methods to remove $NO_x$, $SO_x$ and any residual HF.

Two processes for the recovery of fluorides are taught in the current invention to account for anticipated variations in equipment configuration and capacity and in operating procedures among typical aluminum reduction smelters. One process, set forth in greater detail in Example 2 below, applies the fluoride rich gas stream from the plasma torch furnace to a wet scrubber and treats the resulting quench water with aluminum hydroxide to produce aluminum fluoride, which has utility for recycling back to the aluminum production process. Residual contaminated treatment water from this process may then be returned to the plasma torch furnace for further treatment, alone or with the SPL.

A second process, set forth in greater detail in Example 3 below, applies the fluoride rich gas stream directly to a counter-flow dry scrubber, which is a common element is most modern aluminum reduction plant smelters. Residual contaminants from the process of the present invention are mixed with the waste gas which flows from the smelter pots for treatment by existing aluminum plant wet scrubbers and waste water treatment systems.

In either process, the high quality heat content of the off gas stream of the furnace at 1000° C., or more, heat energy may also be recovered by process operations in the aluminum production process, such as paste plant and soaking pit operations.

Silica, alumina, and other refractory inorganic materials carried with the SPL are melted by the plasma torch in the process of the present invention. The molten slag residue is periodically poured from the container and cooled to form a solid slag material. If the slag is intended for landfill disposal as clean and non-hazardous waste, additional silica (sand) may be mixed with the SPL at the input feed to increase glassification, and control the leachability of the fluorides in the slag to desired levels. As further detailed below, when land disposal of the slag is intended, the amount of silica which may need to be added to reduce the leachability of the slag to environmental de-listing standards should not detract from the other key and beneficial attributes of the current invention. As an alternative to landfill disposal of the slag, the melt from the plasma torch container may be poured into containers to form ingots, bricks, tiles, or the like construction materials, or it may be broken into aggregate for conversion to products such as rockwool or fiberglass. In either instance, silica, limestone, or other flux materials may also be added to the input feed or to the output pour from the container to control the leachability, hardness, viscosity, or other properties of the molten slag, as may be desired for further processing.

These and other objects of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE PREFERRED EMBODIMENTS

Figure 1:
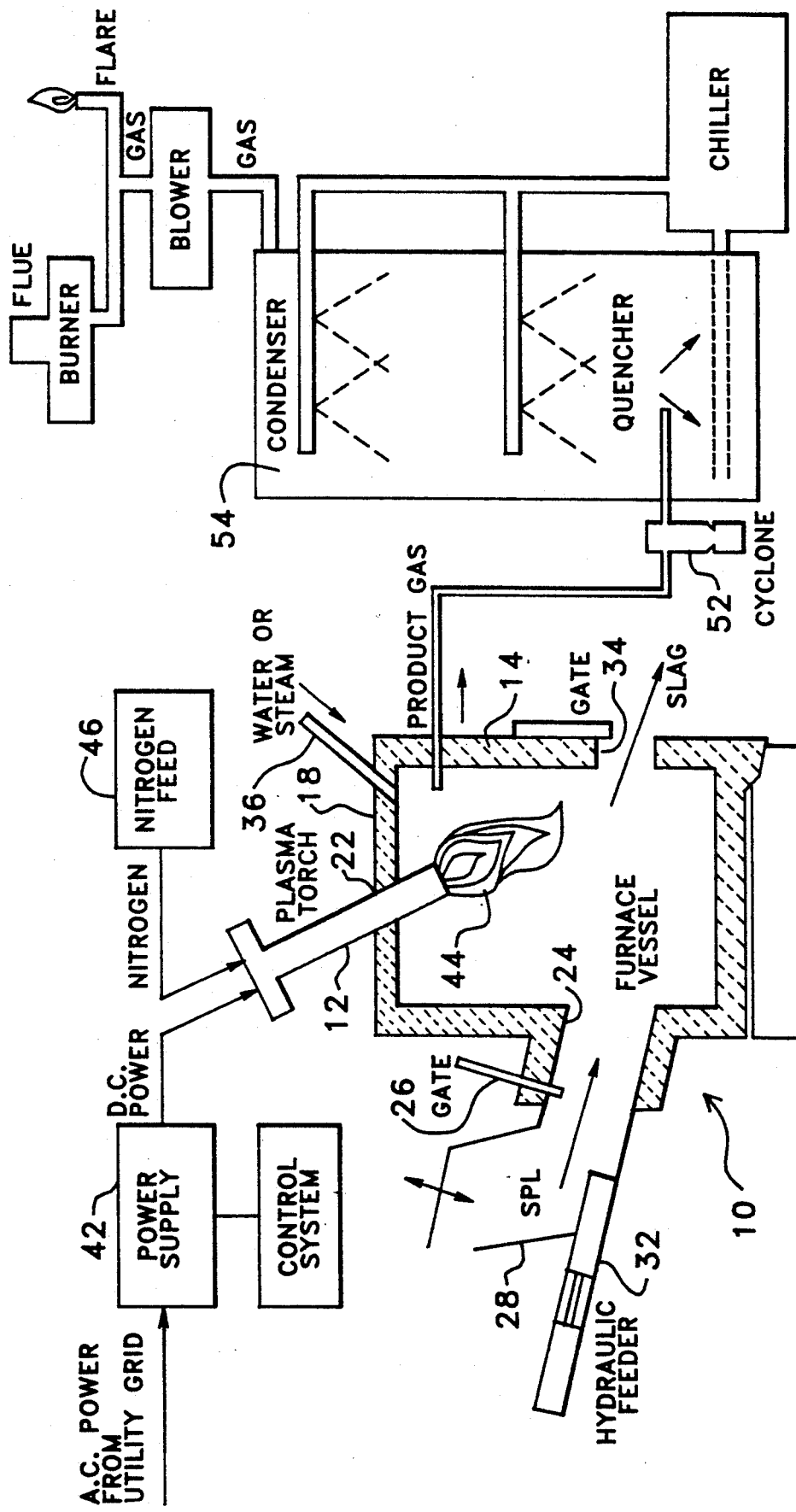
FIG. 1 presents a simplified cross-section of a plasma torch furnace which is suitable for use in the practice of the present invention, which furnace is shown in conjunction with one embodiment of related equipment.

Referring first to FIG. 1, the system of the invention for the treatment of hazardous SPL waste materials is shown diagrammatically, and is generally identified by the reference numeral 10. The system 10 includes a plasma torch 12, connected to a closed and substantially airtight reactor vessel or furnace chamber 14, shown in cross-section. Furnace chamber 14 is either constructed of refractory materials or is lined with refractory bricks, not shown. Furnace chamber 14 is shown as having a base 16 about which chamber 14 may be tipped, a roof 18 through which an opening 22 is provided for the insertion and holding of plasma torch 12, and a side opening 24 controlled by gate 26 through which SPL can be inserted into the furnace 14. SPL is input to side opening 24 through chute 28 and mechanically pushed into furnace 14 by feeder 32, which may be by an enclosed hydraulic ram, an auger type feeder, or other mechanism, as required, to provide input of SPL with or without the substantial addition of oxygen carrying air, as desired. A normally closed slag removal port 34 is located at a low position in a side wall of furnace 14 for the removal of molten slag. Input line 36 is shown provided through roof 18 for the injection of water, steam, gas, or other fluids, as may be required, into furnace 14, for the operation of the process of the current invention. Product gas output line 38 is shown located at a high position in a side wall for removal of gases generated within furnace 14, although gas output line 38 may also be located in roof 18. It is noted that furnace 14, including plasma torch 12, may require as little as 150 square feet of floor space.

Plasma torch 12 is connected to a power supply 42 which converts high voltage A.C. power, for example from a utility grid, to more moderate voltage D.C. power to operate the plasma gun 12. Where system 10 for the treatment of hazardous SPL waste materials is integrated with an aluminum smelter plant, power supply 42 may be the same equipment which serves the aluminum plant. Normal voltages of the torch 12 are in the range of about 1000 to about 1500 volts D.C., with power in the range of 100 Kw to 6 Mw. The plasma arc 44 which is generated by plasma torch 12 is sustained by gas which is supplied from a gas feed 46. A water system, not shown, provides water for the internal cooling of plasma torch 12. The plasma torch 12 may be operated to produce a plasma arc 36 with a flame temperature in the range of at least 3000° C. to about 8000° C., thereby providing for a minimum temperature inside the walls of container 14 of 1000° C. or greater, and a slag temperature in the bottom of about 1200° C. to 1600° C., or greater. The plasma arc 44 is projected from nozzle 48 into furnace 14 at an angle which intersects the pieces of SPL which are fed through side opening 24.

The plasma torch 12 utilized in the practice of the process of the present invention is preferably of a type which is commercially available, e.g., from Plasma Energy Corporation, USA, Retech, Inc., and E. S. Fox, Inc., and is preferably of the direct current transferred arc type (TAT), although other plasma torch types can be utilized. A plasma torch of the preferred type may be obtained from one of several commercial suppliers to provide the power required to accommodate the anticipated mass and volume flow rate of the SPL being input for treatment to furnace 14. Suitable torches are described in Camacho, U.S. Pat. No. 4,383,820; and Camacho et al, U.S. Pat. No. 4,559,439.

Using the system described in FIG. 1 with a plasma torch 12 of 150 kw capacity, a series of experiments were conducted for the purpose of testing the attributes and benefits of the current invention for the plasma torch treatment of SPL. For the purpose of these tests, and as shown in FIG. 1, the system was augmented to include a cyclone catch 52 in the product off-gas stream 38 to capture entrained particulates, and a combined wet scrubber and condenser 54 to recover and measure the soluble constituents in the product off-gas stream.

EXAMPLE 1

The key results of interest in these tests included: (1) the destruction of cyanide; (2) the amount of reduction in mass and volume of the slag relative to the mass and volume of the input SPL; (3) the leachability of fluorides, as a measure of the reduction in the hazardous character of the slag, with and without the addition of silica (sand) to the input SPL; (4) the recoverability of fluorides in the off gas stream; (5) the reduction or elimination of other hazardous constituents in the off-gas stream; (6) the approximate energy requirement per ton of input SPL at the scale of test; and (7) the optimum chunk size of input SPL required to provide uniform treatment in processing.

In describing and understanding the following examples, it is necessary to understand that when SPL is removed from a smelter pot it is common practice to segregate the first layer of SPL, which is primarily brick refractory material, from the second layer of SPL, which is primarily solid carbon. Thus, the following examples will refer to SPL which is primarily brick refractory material, or "cut 1", or primarily carbon material, or "cut 2."

An initial series of tests was conducted by processing small samples of the two types of SPL, "brick", or "cut 1", with a high percentage of spent brick linings, and "carbon", or "cut 2", with a high percentage of carbon. The objective of the first series of tests was to determine the general efficacy of the process, with particular emphasis on the sizing of the input material required for each of the two types of SPL, the mass and volume reduction of the slag for each type of SPL, and the hazardous character and fluoride leachability of the slag resulting from each type of SPL. For each test, water was added to the input to assist in the reduction of carbon materials, and also to assist in the commutation of the input materials when exposed to the plasma arc. In the following tests, these material were exposed to a plasma arc 44 while contained within a graphite crucible and held within a furnace 14 as follows:

TEST 1A

Input

Brick type SPL in a graphite crucible: 1,039.5 grams
Average chunk size: ⅜ inch diameter
H$_2$O added to input: 481.0 grams

Processing Conditions

Crucible outside temperatures of 1200° C.

Output

Slag recovered: 667.5 grams of
Fluoride in slag ranged from: 0.61 to 0.80%
Fluoride in quench water: 80.4 Mg/L (total quench water 516 L)
Fluoride leachate (TCLP) in slag measured at: 23.2 ppm
pH of quench water: 2.69

TEST 1B

Input

100% carbon type SPL in graphite crucible: 604.5 grams
Average chunk size: ⅜ inch diameter
H2O added to input: 447.5 grams

Processing Conditions

Crucible outside temperatures of 1500° C.

Output

Grams of slag recovered: 100
Fluoride in the slag ranged from: 0.11% to 0.16%
Fluoride in quench water: 185.6 Mg/L (including the fluoride from TEST 1A)
Total quench water: 516 L
Fluoride leachate (TCLP) in slag measured at: 35.9 ppm
pH of quench water: 3.12

In these tests, the ⅜ inch chunk size SPL was easily melted. Some sample was found to adhere to the sides of the crucible, and some appeared to be blown or splashed from the crucible, mandating additional tests to determine the throughput of solid residue. In addition, the amount of material in the cyclone catch 52 was too small for analysis. Laboratory analyses were completed on the slag by acidic distillation for each element of concern. Total fluorine concentration was determined as stated above.

A quench water sample taken before the start of Test 1A was found to have a pH of 8.13 and fluoride content of 1.14 Mg/L. The quench water was not charged between the tests. Thus, fluorides were found to be usefully concentrated by a factor of from 70 for TEST 1A to 160 for both TESTS 1A and 1B as a result of the plasma torch processing of the SPL. There was no cyanide found in the quench water sample. All other constituents in the quench water were within environmental standards or routinely recoverable with available waste water treatment facilities.

A combined slag sample from the above tests was also measured for fluoride leachate by the U.S. EPA Toxic Characteristic Leaching Procedure (TCLP), and was measured at approximately 36 ppm, relative to a ground water standard of 4 ppm. Continued experimentation with the process of the present invention will continue in an effort to produce a slag having a leachability of from about 6 to about 12 times the ground water standard level in order to justify the resulting slag being de-listed as a hazardous material.

Informed by the results of the initial tests, additional tests were conducted with larger input samples of SPL being fed continuously to furnace vessel 14. The objectives of this second series of tests were: (1) to confirm the initial results of the first series of tests; (2) to better determine the throughput of slag relative to the input SPL; (3) to assess and measure the presence or absence of constituents in the product gas stream; and (4) to make an approximate determination of the specific energy requirements of the process.

For these tests, the furnace vessel 14 was pre-heated to an ambient temperature of about 1100° C., as measured on the inside of the refractory wall of the furnace. The quencher water was set initially to a minimum pH of 10 and water samples were taken before, during, and after each test for analysis. The quencher water was changed between tests.

Gas chromatograph analyses were performed on the product gas stream and the results were recorded. In addition, Matheson detection tubes were used to test for sulphur dioxide, nitric oxide, hydrogen fluoride and hydrogen cyanide in the gaseous product. The gaseous product was not tested for the presence of sodium, potassium, or calcium salts, as these products are readily removable from the product gas stream by efficient scrubbers which are routinely available.

Each test was of about a one to two hour duration. It was believed that this duration of test permitted a reasonably accurate measurement of the chemical composition of the gaseous product which was produced by the process of the present invention, but would result in apparent specific energy usage significantly higher than that which would be expected in the commercial practice of the invention.

TEST 2A

Input

Brick type SPL in continuous feed to full vessel: 170.9 lbs
H$_2$O added to input: 34.2 lbs

Processing Conditions

Duration of test: 120 minutes
Temperature at start: 1100° C. at slag surface
Temperature at end: approx. 1330° C. just before pour.

Output

Solid slag residue recovered: 136.7 lbs
Cyclone catch recovered: 23 grams dry/259 grams wet
Average gaseous product: 2500 CFH Fluoride leachate (TCLP) in slag measured at: 14.5 ppm
Fluoride in quench water, in three samples: from 12 Mg/L before the test to 1780 Mg/L after the test,
$SO_x$: from 2.5 to 8.0 ppm in three samples
$NO_x$: none detected in two samples
HF: from 0.75 to above 30 ppm in three samples
HCN: none to less than 0.5 ppm in two samples
$H_2$: None detected
CO: None detected The SPL material was processed more quickly by the plasma torch than had been expected, and could not be fed fast enough by the available feed mechanism to achieve a good steady state operating condition. In an attempt to feed faster, the feeder lid 32 was required to remain open longer than originally anticipated. This procedure allowed additional oxygen containing air to enter the furnace 14. Nitrogen was used exclusively as the gas from gas supply 46 through plasma torch 12.

As a result of this test, the specific energy requirement of the material was computed at approximately 1820 kwh/ton. Recognizing the small size of the test furnace, the relatively low efficiency of the plasma torch, and the discontinuous feed during the test, it was estimated that the specific energy requirement at commercial scale would be in the range of from about 500 to about 1000 kwh/ton, with state of the art operational improvements.

TEST 2B

Input

Carbon type SPL in continuous feed to full vessel: 258.6 lbs
$H_2O$ added to input: 77.6 lbs

Processing Conditions

Duration of test: 93 minutes
Temperature at start: 1,050° C. at slag surface
Temperature at end: approximately 1360° C., just before slag pour

Output

Solid residue recovered: 38.7 lbs
Cyclone catch recovered: 1033 grams
Average gaseous product: 1750 CFH
Fluoride leachate (TCLP) in the slag measured at: 35.9 ppm
Fluoride in the quench water: from 6 before the test to 2950 Mg/L after the test.
$SO_x$: from 0 to 3 ppm in four amples
$NO_x$: from 1.5 to 5 ppm detected in four samples
HF: from none to less than 0.5 ppm in three samples
HCN: none detected in four samples The SPL material processed immediately upon entry into the furnace and could not be fed fast enough by the available feed mechanism to achieve a good steady state operating condition. In attempting to feed faster, excessive oxygen bearing air was allowed to enter the furnace. Nitrogen was used exclusively through the plasma torch. The specific energy requirement of the material was computed at approximately 1760 kwh/ton for this test. Recognizing the low efficiency of the plasma torch which was used, the small size of the test furnace and the discontinuous feed during the test, it was estimated that the specific energy requirement at commercial scale would be in the range of about 300 to about 600 kwh/ton with known process improvements.

Informed by the results of the tests described above, three additional crucible tests were run: (1) to determine the effect of mixing silica with the input feed on the leachability and physical properties of the solid slag residue; and (2) to collect additional data on processing rates. In each of the following three tests, approximately equal parts of brick and carbon type SPL were used

TEST 3A

Input

Brick SPL: 2.905 kg
Carbon SPL: 2.765 kg
Sand: none
Water: 0.9 kg
Volume of SPL: 4525 cc

Processing Conditions

Duration of test: 58 minutes
Temperature at end: 1600° C.

Output (Input SPL/Solid Residue Reduction Ratios)
Weight reduction, dry: 3.77:1
Weight reduction, wet: 4.33:1
Volume reduction: 6.63:1
Fluoride leachate (TCLP) in slag measured at: 235 ppm

TEST 3B

Input

Brick SPL: 1.428 kg
Carbon SPL: 1.408 kg
Sand: 0.720 (about 20%, by weight)
Water: 0.450 kg
Volume of SPL: 2741 cc

Processing Conditions

Duration of test: 40 minutes
Temperature at end: approximately 1600° C.

Output

Input SPL and Sand/Solid Residue Reduction Ratios
Weight reduction, dry: 1.49:1
Weight reduction, wet: 1.68:1
Volume reduction: 2.98:1

Input SPL/Solid Residue Reduction Ratios
Weight reduction, dry: 1.19:1
Weight reduction, wet: 1.38:1
Volume reduction: 2.46:1
Fluoride leachate (TCLP) in slag measured at: 25 ppm

TEST 3C

Input

Brick SPL: 1.395 kg
Carbon SPL: 1.340 kg
Sand: 2.87 (about 51%, by weight)
Water: 0.450 kg
Volume: 3991 cc

Processing Conditions

Duration of test: 42 minutes
Temperature at end: approximately 1800° C.

Output

Input SPL and Sand/Solid Residue Reduction Ratios
Weight reduction, dry: 1.82:1

Weight reduction, wet: 1.96:1
Volume reduction: 3.88:1

Input SPL/Solid Residue Reduction Ratios

Weight reduction, dry: 0.89:1
Weight reduction, wet: 1.03:1
Volume reduction: 2.03:1
Fluoride leachate (TCLP) in slag measured at: 17 ppm Without the addition of sand, the molten SPL was found to be light and fluffy; the addition of sand reduced this tendency. The addition of 20% sand was found to significantly enhance the apparent glassine character of the solid residue, and the addition of 50% sand was found to result in a very glassine residue. The weights and volume reductions for the tests 3B and 3C appeared reversed from what might be expected, due to the splashing of sample from the crucible and the more complete volatilization that may have occurred at the higher processing temperature experienced in Test 3C.

As a result of the above series of tests, it was concluded that: (1) cyanide is readily destroyed or reduced to safe limits by the process of the present invention; (2) a significant reduction in both the mass and volume of the input SPL waste could be expected, even with the addition of 20% or more sand, by weight; (3) the leachability of fluorides from the solid residue is controllable to the de-listing level for a mixed sample of brick and carbon type SPL, without the addition of sand, and perhaps to the de-listing level for the solid residue from brick type SPL, without the addition of sand; (4) fluorides are readily recovered by a wet scrubber placed in the gas stream; (5) no other hazardous components were detected in the gas stream which would not be readily recovered by a wet scrubber or remain within levels which are currently permitted by environmental authorities; (6) the extrapolated specific energy requirement of from about 400 to about 800 kwh/ton for combined brick and carbon SPL, using state of the art process improvements, is competitive with other known processes for the treatment of SPL, and may be further reduced by methods which enhance the production of carbon monoxide during the process; and (7) there is no need to mechanically grind the input SPL to chunk sizes less than ¼ inch nugget size, as is required by some other competing processes, and that in fact, the use of larger sizes of SPL may be helpful in achieving a steady state operation.

EXAMPLE 2

Figure 2:
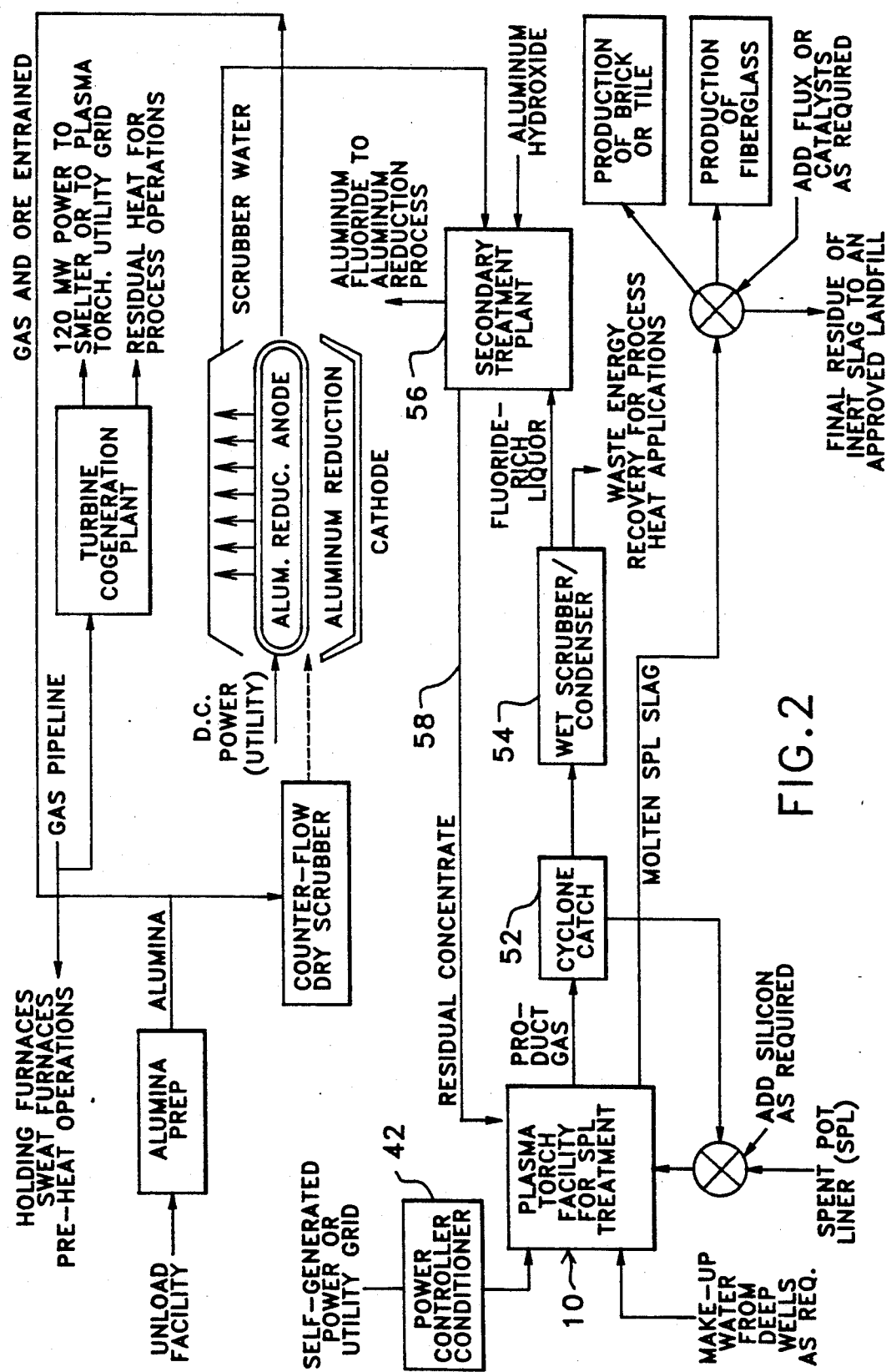
FIG. 2 depicts the application of the plasma torch system described in FIG. 1 in the overall plasma processing system described in Example 2.

FIG. 2 depicts the application of the plasma torch process and equipment as described in FIG. 1, in the integrated system described in Example 2 at a primary aluminum smelter plant. In each of these examples, a mixture of carbon and brick type SPL is reduced mechanically to nugget-sized chunks and fed continuously by an auger type feeder, together with silica in the amount of 10% to 20% of the input weight of SPL to a plasma torch furnace system 10. The combined plasma torch/furnace system 10 employs a plasma torch 12 of the transferred arc type, having a 1.5 mw power capacity operating from a high voltage D.C. power controller conditioner 24 which is in existence at the aluminum plant, and is otherwise of the same general configuration described in FIG. 1. Because of its compact size and complementary character with the aluminum product process, the plasma processing system of the present invention is preferably located in close proximity to other operations of the smelter, thereby minimizing the need to transport SPL materials for any substantial distances, and obviating the need for a separate expensive power supply 24. The power consumption is in the range of about 400 to about 800 kwh per ton of SPL which is treated.

Upon introduction to the furnace, the SPL is rapidly elevated to a temperature of at least 1000° C., and preferably at least 1100° C. in an oxygen deficient atmosphere, whereupon the volatile constituents of the SPL are gasified, oxidized, dissociated and pyrolized, with small quantities of particulates entrained in the product gas stream, while the inorganic brick materials and some of the fluoride compounds are reduced to a molten slag. The gaseous products produced from the plasma torch processing of SPL consist of carbon compounds selected from the group consisting of combustible carbon monoxide, carbon dioxide, combustible hydrocarbons, and mixtures of the same, fluoride compounds, nitrogen, and relatively small quantities of oxides of sulphur and nitrogen, and other gases which are benign. Both the weight and volume of the resulting slag is substantially reduced as compared to the starting weight and volume of the starting SPL, or the starting SPL and sand combination. Where SPL is treated without added silica, the weight (mass) of the slag is reduced by a factor of about 3.5:1; while SPL which is treated by the process of the present invention with added silica, the weight (mass) of the slag is reduced by a factor of from about 1.2:1 to about 1.6:1. Where SPL is treated without added silica, the volume of the slag is reduced by a factor of about 6:1; while SPL which is treated by the process of the present invention with added silica, the volume of the slag is reduced by a factor of from about 2.4:1 to about 3.2:1. The slag consists primarily of inorganic or inert materials, but may also include other materials, including fluorides which are leachable at levels below that which is considered hazardous by environmental authorities.

The product gas is taken off from the plasma furnace and passed through a cyclonic catch 52, from which the particulate materials which are trapped are periodically returned to the input with the SPL for further processing. The product gas is thence directed to a condenser apparatus 54 which treats it with a water based liquor to capture remaining gases and particulates and to condense, dissolve, and concentrate the soluble gases and particulates into a liquor which is fluoride rich. The fluoride-rich liquor is reduced with aluminum hydroxide, or with some other suitable aluminum compound, in a secondary liquor treatment plant 56 to precipitate aluminum fluoride. The resulting aluminum fluoride is then removed and dried for consumption at the resident aluminum smelter, or is marketed to other primary aluminum reduction smelters. The residual liquor is returned through line 58 to plasma torch facility 10 for further processing. The energy recovered in the heat exchange of the condenser 54 is applied to pre-heat operations in the aluminum production systems paste plant and soaking pits.

The molten slag is periodically removed from furnace 14 through slag removal port 34, and poured into molds or other fixtures, not shown, for subsequent use in the production of bricks, tiles, construction aggregates, and fiberglass, or for benign disposal as non-hazardous material in class A landfills.

By this process, the entire current annual production of a resident aluminum smelter can be treated, as can be the SPL wastes which have been previously stored at that site. The solid material is converted to marketable products or to landfill of reduced weight and volume, although supplies of solid residue may also be stored for subsequent reprocessing to marketable products. The alternative process of transporting high volumes of hazardous materials for treatment at a site which is remote from the smelter site is thus avoided. The fluoride content of the SPL is recovered and converted to aluminum fluoride for consumption in the production of aluminum, thereby partially avoiding the significant costs for this material. A substantial portion of the energy content which is available from the solid carbon portion of the SPL, and of the energy used for the plasma torch is recovered and applied for the routine operations of the smelter. Remaining gaseous products are benign and released to the atmosphere, or are removed and made benign before such release. The ultimate effect is a relatively simple and highly effective process by which the high volume and hazardous character of SPL is destroyed, thereby obviating a major environmental hazard, for which no suitable and economical integrated solution has previously been found. Solid and gaseous products and energy are recovered and recycled to yield useful products, new revenue sources, and cost savings, thereby improving the overall economic efficiency of any primary aluminum production process with which it is integrated.

EXAMPLE 3

Figure 3:
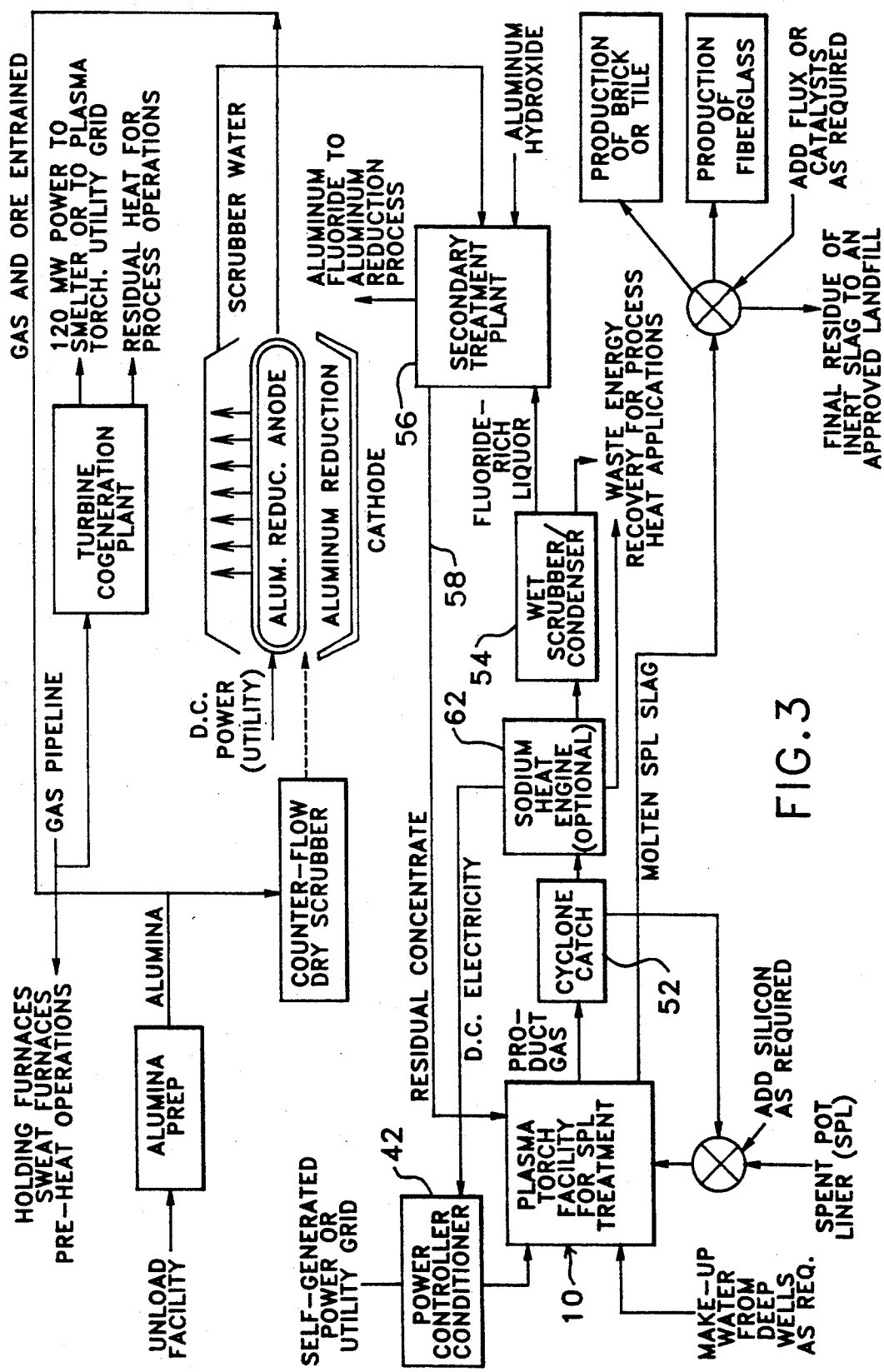
FIGS. 3 through 5 depict the application of the plasma torch system described in FIG. 1 in the overall plasma processing system described in Examples 3 through 5.
Figure 4:
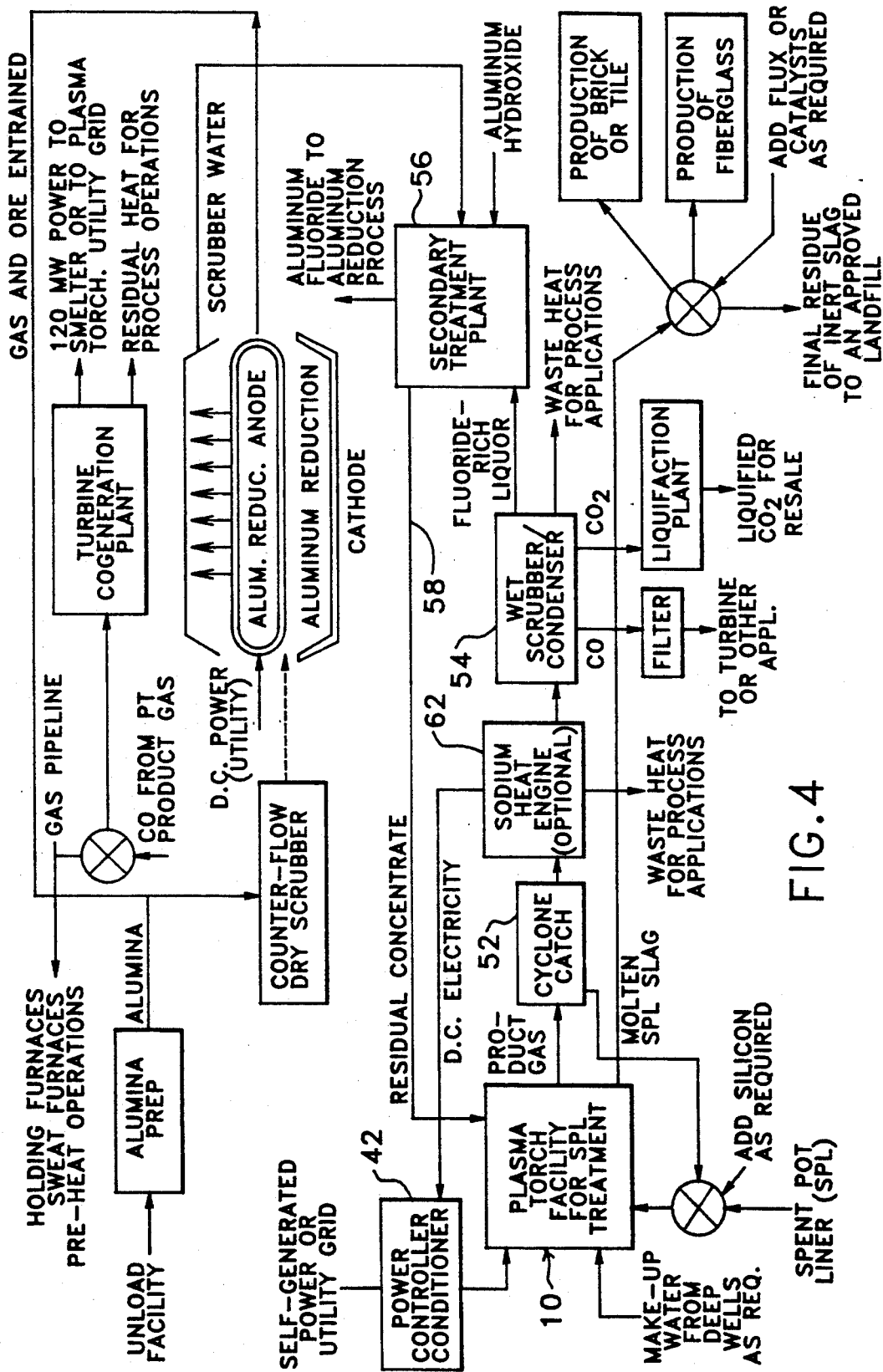

The process described in FIG. 2 of Example 2 is modified as shown in FIG. 3, such that a Sodium Heat Engine (SHE) 62 is placed in the product gas stream between the plasma furnace and the wet scrubber. A Sodium Heat Engine 62, of the type currently under commercial development by Advanced Modular Power Systems, of Ann Arbor, Mich., is a device in which a voltage is developed across a beta alumina membrane by developing a sodium vapor pressure across, and an ion flow through, the membrane. It is understood that the SHE 62 is able to convert heat energy to electrical energy with an efficiency as high as 30% when using a heat source of 1000° C. or higher. Each unit SHE cell generates direct current at a low voltage, but individual cells may be arranged in a grid of series and parallel units to achieve the desired output voltage and power level, consistent with the available heat source.

Because of the bi-phase sodium working medium employed by the SHE 62, the device is made from materials chosen for their suitability for cooperation in a high temperature and corrosive environment. The current invention produces a product gas with an exit temperature from furnace 14 which may exceed 1000° C. or more, and which is also rich in fluorides. As described in FIG. 3 of this example, the process of this example inserts a commercially supplied matrix of Sodium Heat Engine cells in product gas stream to convert high quality heat energy in the product gas directly to electricity. The SHE matrix is placed in close proximity to the plasma furnace to take full advantage of the high temperature of the product gas at that point in the process, as high as 1000° C. or more.

The matrix of SHE cells is configured such that the electrical energy generated can be recycled to the electrical input 24 of the plasma torch 12 through a power conditioner/controller to offset the net energy requirements of the plasma torch. Alternatively, the direct current source may be used for other D.C. process applications, or processed by an invertor for use with A.C. applications.

The heat sink for the Sodium Heat Engine 62 may operate at 300° C. or more, providing an additional and useful energy source for process heat applications. For example, a process heat pickoff may be arranged at either the sink of the Sodium Heat Engine or the heat sink of the dry scrubber/condenser.

EXAMPLE 4

In this example, the process described in FIG. 3 is modified to permit the extraction of either carbon monoxide or carbon dioxide from the scrubber condenser 54. As noted above, treatment of the carbon portion of the SPL in the plasma furnace system 10 may result in the production of a mix of substantial quantities of carbon monoxide and carbon dioxide in the product gas. The mix of carbon monoxide and carbon dioxide in the product gas will depend, among other things, upon: (1) the carbon content of the SPL which is being treated; (2) the mix of brick and carbon type SPL which is being treated; (3) the amount of oxygen allowed within the furnace, relative the amount of carbon being treated; (4) the presence of catalysts which may be added to the SPL or to the furnace; and (5) the flow of water to the furnace. For this example, a SPL feed system is chosen so that oxygen can either be allowed or denied to the furnace vessel. When it desired to produce a preponderance of carbon monoxide, the furnace will be operated in an oxygen-deficient environment, with nitrogen used as the plasma medium. When it is desirable to produce carbon dioxide, the furnace will be operated in an atmospheric or oxygen-rich environment.

Carbon monoxide which is so produced is taken off of condenser 54 as it is chilled, is then filtered, and supplied to combustion applications, or it may be blended with natural gas for combustion applications on or off-site. Carbon dioxide is taken off the condenser 54 as it is chilled and supplied to a conventional liquefaction plant for subsequent resale off-site.

EXAMPLE 5

Figure 5:
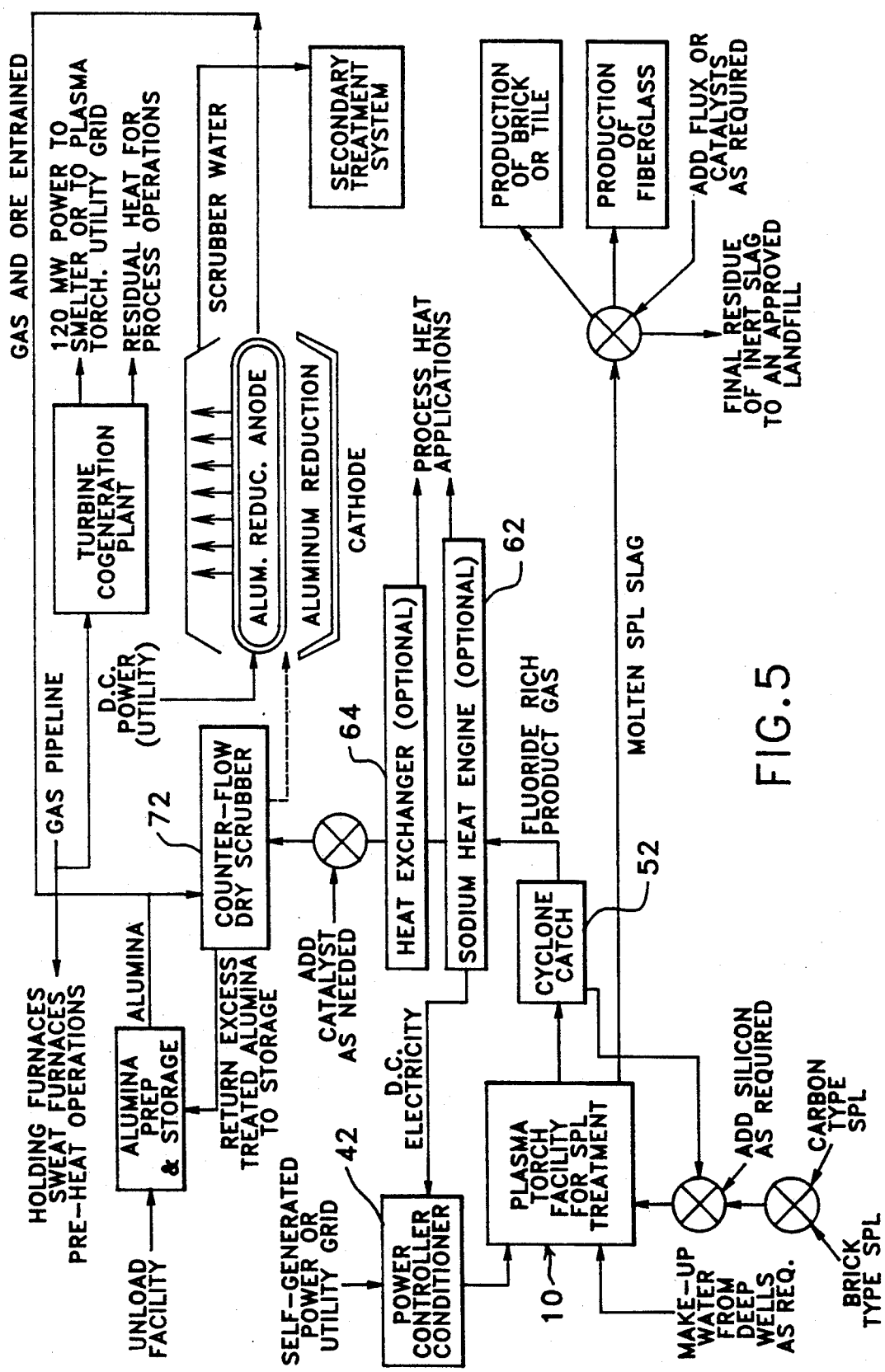

The process described in FIG. 5 is established such that the product gas from the plasma furnace 10 described in FIG. 1 of the current invention is directed through two optional energy recovery steps and recycled to the counter-flow dry scrubber 72 of the resident primary aluminum reduction smelter, with or without the addition of catalysts. The Sodium Heat Engine is as described in Example 3.

Many modern aluminum smelters employ counter-flow dry scrubbers 72 by which fluoride rich gases from the pot lines may be adsorbed onto the alumina before it is introduced into the aluminum reduction cells. This process permits more efficient use of the fluorides that are required for production of aluminum and minimizes the release of fluorides to the atmosphere from the production process.

Recycling the fluoride-rich product gas from the plasma furnace to the counter-flow dry scrubbers enables another option for pre-treatment of alumina to enhance adsorption of fluoride. In the event that the quantity of fluoride is more or less than that which can be fully adsorbed by the flow of alumina required for ongoing operations, this example also teaches that art known catalysts may be added to activate the alumina for additional adsorption or that an excess of treated alumina can be returned to the alumina preparation area for storage. It is also possible to regulate the production of fluorides in the plasma torch treatment of SPL in the process of the present invention by adjusting the mix of input SPL to include a preponderance of either brick type SPL or carbon type SPL as required, thereby taking advantage of the differential in fluoride content that generally exists between the SPL types.

Other gases present in the product gas stream are directed through the existing environmental treatment systems of the aluminum production process. To facilitate this example, the plasma furnace may be operated in an oxygen rich environment to avoid the production of carbon monoxide.

The process of FIG. 5 also teaches the optional insertion of a heat exchanger 64 as an additional step between the take-off of product gas from the furnace and the scrubber/condenser. Heat exchanger 64 is designed with the use of refractory materials suitable for high temperature and corrosive gas streams, permits the extraction of process heat for resident applications (such as paste plant process heating or soaking pit preheating). The temperature reduction across the heat exchanger reduces the input temperature to the scrubber/condenser, thereby minimizing the energy required for the extraction of carbon monoxide or carbon dioxide.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

What is claimed is:

1. A method of treating hazardous solid spent potliner material from aluminum reduction cells, which solid spent potliner material has an initial volume and mass, and includes solid carbon material, solid inorganic material, fluoride compounds, sulfur compounds, and cyanide compounds, including the steps of:
   a. introducing said solid spent potliner materials into a vessel; and then
   b. exposing said spent potliner materials to the heat of a plasma torch within said vessel for a time and at a temperature such that:
   i. said solid carbon material portion of said spent potliner material is substantially completely gasified and converted to a carbon compound selected from the group consisting of combustible carbon monoxide, carbon dioxide, or combustible hydrocarbons, and mixtures of the same;
   ii. said solid inorganic material is substantially completely melted within said vessel to form slag;
   iii. said fluoride compounds are either melted, reduced or vaporized within said vessel;
   iv. said cyanide compounds are all substantially completely destroyed by pyrolysis, dissociation, or oxidation; and
   v. any and all other spent potliner materials, including said sulfur compounds, are either substantially completely melted to form slag, or gasified, pyrolized, dissociated, or oxidized;

with the result that said hazardous solid spent potliner material from aluminum reduction cells is rendered non-hazardous, and the remaining slag has both its solid volume and mass substantially reduced relative to the mass and volume of the input solid spent potliner material, thereby avoiding many of the equipment and operating complexities associated with the non-plasma torch combustion or incineration of spent potliner.

2. The process of claim 1, wherein the process temperatures at the inner walls of said vessel equals or exceeds about 1000° C.

3. The process of claim 1, in which said hazardous solid spent potliner material has both its initial solid volume and mass substantially reduced relative to the mass and volume of the input solid spent potliner by a factor of at least 1.5:1 in mass and at least 3:1 in volume.

4. The process of claim 1, wherein said vessel is substantially closed to the atmosphere, and said plasma torch treatment of said solid spent potliner material is carried out in the absence of sufficient oxygen to completely oxidize said solid carbon which is present in said spent potliner, with the result that at least a portion of said solid carbon is converted to combustible carbon monoxide.

5. The process of claim 1, wherein said gases formed in said vessel by said plasma torch treatment of said solid spent potliner material are withdrawn from said vessel and directed to an apparatus which captures particulates which are entrained in said gases.

6. The process of claim 5, wherein said captured particulates are recirculated back to said vessel for a further plasma torch processing step.

7. The process of claim 1, wherein said gases formed in said vessel by said plasma torch treatment of said solid spent potliner material are withdrawn from said vessel and directed to an apparatus which captures gaseous fluoride compounds.

8. The process of claim 7, wherein said captured fluoride compounds are added to the counterflow dry scrubber of a Soderberg smelting process for recovery.

9. The process of claim 1, wherein water is input to said vessel to increase the reactivity of the solid carbon material, and to aid in the commutation of the input materials for more efficient reactivity and volatilization.

10. The process of claim 9, wherein said gases which are produced in said vessel, and any entrained particulates formed in said vessel by said plasma torch treatment of said solid spent potliner material are withdrawn from said vessel and directed to an apparatus which treats them with water based liquor to capture said gases and particulates, and further including the step of circulating the resulting water based liquor back to said vessel, thereby displacing the need for a portion of input water, and to provide for a further processing step of plasma torch treatment of the materials captured in said water based liquor.

11. The process of claim 1, wherein the molten slag material produced within said vessel is removed from said vessel, and then cooled to form a solid inorganic slag which is substantially free of cyanide compounds, is substantially impervious to leaching, but to the extent that said solid inorganic slag includes any leachable fluoride compounds, said leachable fluoride compounds are present in a concentration which is less than hazardous levels, so that said slag is benign and safe for landfill disposal.

12. The process of claim 11, wherein silica containing material is added to the container along with said solid spent potliner in order to reduce the amount of fluoride which can be leached from the solid inorganic slag.

13. The process of claim 11, wherein the silica containing is material added in an amount by weight of about 20% or less, of the weight of solid spent potliner which is introduced to the vessel.

14. The process of claim 13, in which said hazardous solid spent potliner material has both its initial solid volume and mass substantially reduced relative to the mass and volume of the input solid spent potliner by a factor of at least 1.2:1 in mass and at least 2.5:1 in volume.

15. The process of claim 11, wherein said molten slag material is poured into molds and cooled to form useful by-products which are suitable for commercial use, such as bricks, tiles or aggregate material.

16. The process of claim 11, wherein said molten slag material is cooled and then used in the production of rockwool or fiberglass materials.

17. The process of claim 11, wherein the molten slag material produced within said vessel is stored within said vessel for a period of time, and then periodically removed from said vessel while still in a molten phase.

18. The process of claim 1, in which said vessel and plasma torch combination is located at an aluminum smelting site, whereby adequate electrical power facilites are available for the process, and at which there is an existing demand for recovered fluoride compounds.

19. The process of claim 1, including the additional step of recovering thermal energy produced in said process for beneficial use.

20. The process of claim 1, including the additional step of recovering combustible carbon compounds produced in said process for beneficial use.

21. A method of treating hazardous solid spent potliner material from aluminum reduction cells, which solid spent potliner material has an initial volume and mass, and includes solid carbon material, solid inorganic material, fluoride compounds, sulfur compounds, and cyanide compounds, including the steps of:
   a. exposing said spent potliner materials to the plasma arc of a plasma torch within a vessel for a time and at a temperature of at least 1000° C. to substantially completely convert said spent potliner materials to gas or to molten slag within said vessel whereby said hazardous solid spent potliner material has both its initial solid volume and mass substantially reduced relative to the mass and volume of the input solid spent potliner by a factor of at least 1.5:1 in mass and at least 3:1 in volume;
   b. removing the molten slag material produced within said vessel from said vessel; and then
   c. cooling said molten slag material to form a solid inorganic slag which is substantially free of cyanide compounds, is substantially impervious to leaching, but to the extent that said solid inorganic slag includes any leachable fluoride compounds, said leachable fluoride compounds are present in a concentration which is less than hazardous levels, so that said slag is benign and safe for landfill disposal.

22. The process of claim 22, wherein said plasma of said plasma torch is directed into a vessel, and wherein further, said solid spent potliner material is inserted into the same vessel in a manner such that said solid spent potliner material intersects with said plasma of said high temperature plasma torch in a manner such that substantially all of said solid spent potliner material is either melted or gasified.

23. A process of treating hazardous spent potliner material from aluminum reduction cells, which solid spent potliner material has an initial volume and mass, and includes solid carbon material, solid inorganic material, fluoride compounds, sulfur compounds, and cyanide compounds, to produce carbon compounds selected from the group consisting of combustible carbon monoxide, carbon dioxide, or combustible hydrocarbons, and mixtures of the same, by substantially completely gasifying said solid carbon material portion of said spent potliner material; producing a molten slag by substantially completely melting said solid inorganic material portion of said spent potliner material; producing either molten or gaseous fluoride compounds by either melting or gasifying said fluoride compound portions of said spent potliner material; substantially completely gasifying and pyrolyzing, dissociating, or oxidizing said cyanide compound portions of said spent potliner material; and producing benign and inert materials from any and all other spent potliner materials, including said sulfur compounds, by either substantially completely melted them, or by gasifying and pyrolyzing, dissociating, or oxidizing all other portions of said spent potliner material; including the steps of:
   a. charging said spent potliner material to a vessel equipped with a plasma torch for heating said spent potliner material charge;
   b. heating said spent potliner material charge by providing plasma energy to said charge, which plasma energy is generated by feeding a gas to said torch for ionization;
   c. continuing said heating until said spent potliner material charge is molten; and
   d. removing molten slag and gases from said furnace, with the result that said hazardous solid spent potliner material from aluminum reduction cells is rendered non-hazardous and has both its initial solid volume and mass substantially reduced relative to the mass and volume of the input solid spent potliner material.

24. A process for treating hazardous solid spent potliner material which includes solid inorganic material, solid carbon material, and materials which are subject to gasification, pyrolysis, disassociation, and oxidation, which comprises:
   introducing the hazardous solid spent potliner material into a furnace;
   by directing a plasma torch into the furnace, heating the hazardous solid spent potliner material to a temperature above the melting point of the solid inorganic portion, and also above the gasification point of the solid carbon, and the melting point or gasification point, pyrolysis point, disassociation point, or oxidation point of its other ingredients; and
   removing the molten material and the gas from the furnace.

* * * * *